United States Patent Office 3,290,124
Patented Dec. 6, 1966

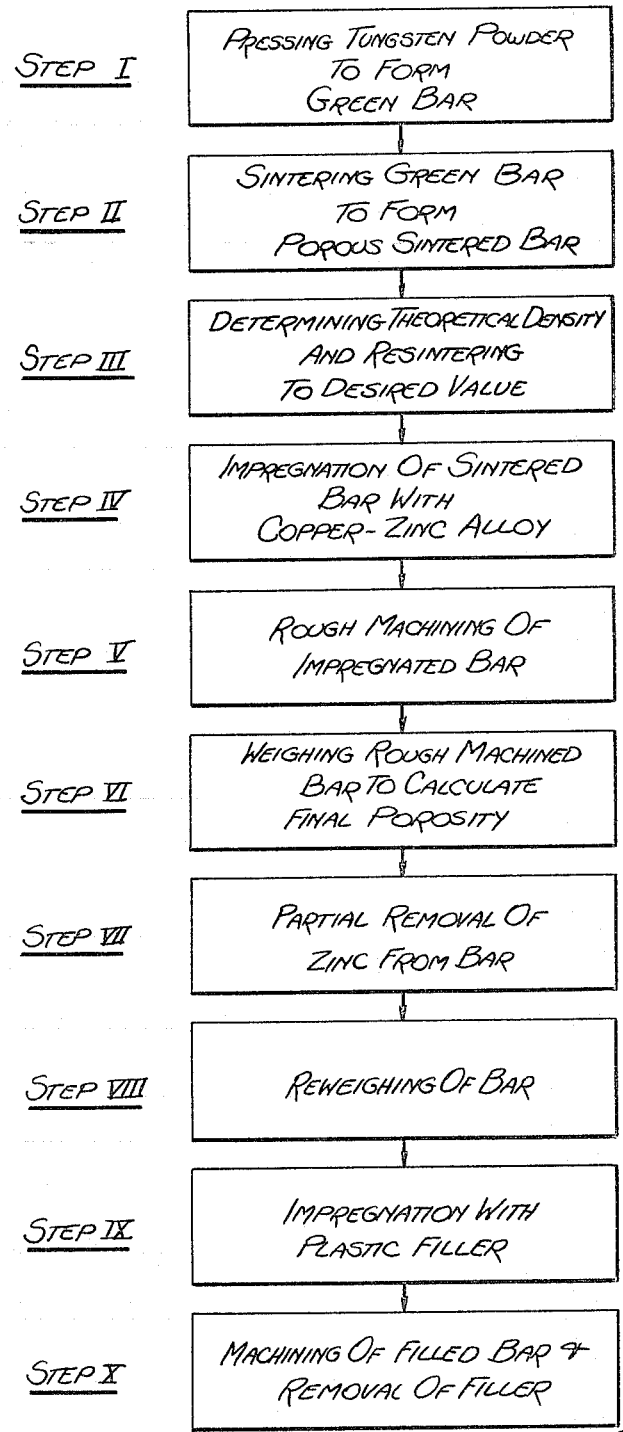

3,290,124
POROUS ELECTRICAL DISCHARGE MACHINE ELECTRODES
John Sam Holtzclaw, Jr., Clermont, Fla., assignor to Rametco, Inc., Clermont, Fla.
Filed Oct. 29 1964, Ser. No. 407,459
10 Claims. (Cl. 29—182.1)

This invention relates generally to electrodes adapted for electrical discharge machining techniques, and more particularly to electrodes adapted to permit the flow of a dielectric fluid through the structure, which have a good wear ratio and one easily machined.

The electrical discharge machining technique is commonly referred to as "EDM." It is based on the controlled erosion of a metal arising from a rapidly recurring spark discharge impinging on the surface being machined. The workpiece melts in a small area surrounding the point at which it is struck by the spark, and a portion of the liquefied or vaporized metal is expelled. This is accomplished by submerging the workpiece and the spark electrode or tool in a dielectric fluid which is circulated to flush away the eroded swarf. The electrode and workpiece separation is maintained by a servomechanism.

The EDM technique is especially useful in fabricating difficult-to-machine parts and in the formation of odd-shaped holes, die cavities and other intricate configurations which defy traditional cutting-tool methods. It is also of great value in certain machining applications where tool force or pressure must be held to a minimum.

Despite the absence of direct contact between the workpiece and the EDM tool, tool wear is the most significant factor in determining the feasibility of the EDM method. Not only does erosion of the workpiece take place when the spark strikes its surface, but the electrode emitting the spark is also subject to attack. For some electrode materials it has been found that electrode wear exceeds workpiece erosion, hence such electrodes are impractical. In order for an EDM electrode to be commercially feasible, the wear ratio must be such that more metal is removed from the workpiece than is extracted from the electrode. The greater this ratio, the more practical the electrode.

The reasons for EDM electrode wear are highly complex, but it has been postulated that as the spark leaps from the electrode to the workpiece, a field is created in which thermal heat and ions flow to attack the electrode structure. Consequently, the higher the melting point of the electrode material, the less it is susceptible to attack.

However, the melting point is not the only factor which must be taken into account in the choice of electrode material. The eroded area of the workpiece assumes a shape which complements that of the electrode. Therefore, as the electrode must be machined to a desired configuration, the machinability of the electrode material is a vital commercial factor. It is for this reason that carbon, which has a high melting temperature nevertheless leaves much to be desired as an EDM material, for carbon is brittle, it is subject to thermal and mechanical shock, and cannot readily be machined to a desired shape.

Certain EDM operations have been found to be very difficult regardless of the type of electrodes now available. Although the EDM electrode never touches the workpiece, smooth EDM operation requires a constant flow of fresh, clean dielectric fluid between the end of the electrode and the workpiece to wash out the debris formed by the cutting action of the electrical spark. If the debris is not removed the arc will cease and all cutting action will stop.

For example, if a blind hole is being cut, then there is no way to remove the debris from the bottom of the hole other than physically moving the electrode in and out and somehow providing a flushing action. In some cases it is practical to drill a hole through the center of the electrode and force clean fluid via a pump through this hole to the bottom. The debris is thereby forced out from under the cutting electrode up the sides and into the main tank reservoir where the dielectric fluid can be filtered and returned to the electrode. Such an electrode with a center hole is practical if the hole being cut goes completely through the workpiece. Otherwise, there is a core left in the workpiece material.

Thus a porous electrode is needed which will allow sufficient clean dielectric fluid to pass through it to flush out the debris. A porous electrode will permit cutting of blind holes, slots, and odd configurations without leaving a core or a nonuniform bottom surface on the workpiece.

A porous electrode should be able to be machined readily. Specific surfaces should be able to be left open and porous, whereas other surfaces must be at least partially blocked so that the flow of dielectric fluid can be directed along certain channels. The porosity of the electrode material must be such that at least a few drops of dielectric fluid will pass through it per minute at 50 p.s.i. which is available on most EDM machines. The wear ratio ought to be better than one, and finally the action should be smooth so that very low currents can be used in order to produce good surface finishes.

The surface finish of the workpiece, as for example the bottom of a tungsten carbide die cavity, should be smooth and it should have a surface roughness below 100 microinches. The surface finish produced by an EDM machine is dependent on the current density of the spark discharge. The lower the current density, the smoother the surface. Also, the smoother the electrode, the smoother the surface, assuming that all other conditions are the same. Thus the size of the holes in the cutting electrode through which the dielectric fluid is pumped should be of the same order of size as the surface finish required. Practically, this limits the pore size to values below 100 microinches for fine finishes, 500 microinches for medium finishes, and 1000 microinches for coarse finishes.

Accordingly, it is the principal object of this invention to provide a porous EDM electrode which will enable the dielectric fluid to pass directly through its structure and which will fulfill the requirements for EDM electrodes as set forth previously.

More specifically, it is an object of the invention to provide an EDM electrode constituted by a porous sintered skeleton formed of a refractory metal such as tungsten, the pores of which are lined with an intermetallic alloy in such a way as to render the total mass of the structure porous.

Also an object of the invention is to provide an EDM electrode which is efficient and reliable in operation and which may be mass produced at low cost.

Briefly stated, these objects are accomplished by first cold-compacting into bar shape, particulates of a refractory metal chosen from the class of tungsten, molybdenum, tantalum and columbium. The cold compact is then sintered in a high temperature range to provide a rigid, porous skeleton. This skeleton is then impregnated with a molten intermetallic to fill all voids therein. One component of the intermetallic, namely the major component, is then removed by vacuum distillation. The remaining porous structure containing the other component of the intermetallic and at least a fraction of the other component is then impregnated with a plastic which facilitates machining of the bar to any desired shape. The plastic is thereafter removed by vacuum distillation or simply by heating the object in air, leaving a porous structure of desired shape, all surfaces being open and porous.

If one desires to block the pores of any given surface, then it is only necessary to remachine this surface at this stage. Specifically, one may impregnate a 50% dense tungsten bar with an 80% Zinc–20% Copper by weight intermetalic, then remove 75% of the Zinc by distillation to produce a porous tungsten bar containing a one to one ratio by weight of Zinc and Copper which is distributed throughout the porous structure to permit the flow of dielectric fluid and at the same time give smooth EDM action and good wear ratios.

For a better understanding of the invention, as well as other objects and features thereof, reference is made to the following detailed specification to be read in conjunction with the drawing showing a flow chart of a process for making a porous EDM electrode in accordance with the invention.

GENERAL DISCLOSURE

A new family of EDM electrodes may be made by combining a refractory metal selected from the class of tungsten, molybdenum, tantalum and columbium, with specific intermetallic alloys. The major component of the intermetallic alloy is partially vacuum distilled from the body, thereby leaving a porous refractory metal structure, the pores of which are lined with the remaining intermetallic alloy. Such a porous structure is then plastic impregnated to permit machining without closing the pores. Finally, the plastic is removed by vacuum distillation or by heating in air.

The selected refractory metal in particulate form is processed by powder metallurigal techniques, the first step being to cold-compact the particulates into green bar shape, the green bar thereafter being sintered. Sintering of both tungsten and molybdenum is carried out in a reducing atmosphere such as hydrogen or cracked ammonia, or in a protective atmosphere employing an inert gas such as nitrogen. Other suitable atmospheres may be used with other refractory metals. The sintering temperature range is between 1400° C. and 2700° C., and is preferably in the neighborhood of 2000° C. Below 1400° C., little or no sintering takes place and effective interparticulate bonding does not occur.

It is essential that the sintering temperature be high enough so that the fine refractory particulates join each other to form a very rigid porous structure. Under these conditions, the sintering temperature of the compact is always much higher than the melting point of the intermetallic alloy thereafter used to impregnate the pores. The strength and final sintering density of the bar is a function of the compaction pressure applied to the particulates. In practice, a range of about 10,000 to to 30,000 p.s.i. is suitable to produce the desired porous structures. Thus tungsten bars pressed at 16,000 and 20,000 p.s.i. exhibited only about a 1% difference in theoretical density when sintered under exactly the same conditions.

The method set forth below will describe the formation of a porous tungsten structure the pores of which are coated with a copper-zinc intermetallic alloy. It is to be understood, however, that apart from the use of appropriate sintering atmospheres, the method is essentially the same for other combinations falling within the scope of the invention.

EXAMPLE OF METHOD

*Step I.*—Tungsten powders having a mean particle size of 10 microns are pressed in a suitable die into bars, using a pressure of 20,000 p.s.i. Such green bars, even without the use of a binder, have sufficient coherence and strength to be handled, and they can be readily shaped by hand tools.

*Step II.*—The green tungsten bars are then loaded into a high-temperature sintering furnace where the temperature is slowly raised to about 1650° C., and maintained at this level for about 10 minutes. It has been found that for 10 micron commercial tungsten powders pressed at 20,000 p.s.i. and sintered at 1650° C. for 10 minutes, the resultant structure has a density of 84% of theoretical. It will be appreciated that by proper adjustment of time and sintering temperature parameters, other values of theoretical density may be obtained.

*Step III.*—For purposes of quality control, the porous tungsten bars formed in Step II are weighed first in air and then weighed again in mercury. From these two values the percentage of theoretical density can be computed. If the percentage falls below the desired amount, the bars can be re-sintered until the requisite value is attained. To insure uniform skeletons, the theoretical density should be held to within plus and minus 2%.

*Step IV.*—The porous sintered tungsten bars are then loaded into a high-temperature impregnation furnace having a hydrogen atmosphere. An amount of copper-zinc alloy (20 Cu-80 Zn, by weight) sufficient to effect complete impregnation is placed around and in contact with the bars. The furnace temperature is then slowly elevated until the alloy becomes molten and starts to wet the porous tungsten skeletons. At this point, the temperature is increased rapidly to 1250° C., which is still well below the sintering temperature of the tungsten. This temperature level is held for about 10 minutes, and as a result, all pores of the tungsten skeleton are filled with the molten copper-zinc alloy. The furnace temperature is then quickly reduced to room temperature.

Alternatively, impregnation may be effected by plunging the porous tungsten bars directly into a molten bath of the intermetallic alloy.

Specifically, for an alloy 80% Zinc–20% Copper by weight, one may use a silicon carbide or a carbon cupola. The cupola is filled with the alloy in the presence of a gas, or heated in air to about 1000° C. to 1250° C., at which level one detects zinc oxide fumes. The cold refractory bars are then plunged quickly into the molten bath, the bars being completely submerged. After 10 minutes of submersion, the bars are removed, excess alloy shaken off, and the impregnated bars allowed to cool in air. All of the intermetallic alloys listed hereinafter may be melted in a carbon cupola.

*Step V.*—The tungsten bars impregnated with copper-zinc alloy are rough machined to remove excess impregnant.

*Step VI.*—The rough machined impregnated bars of Step V are weighed in air. Later this weight and the final weight after distillation will be used to calculate the final porosity.

*Step VII.*—The rough machined impregnated bars of Step VI are placed in a vacuum furnace. The pressure is reduced to one micron and the temperature is slowly increased as follows: 1 hour at 600° C., 1 hour at 700° C., and 4 hours at 850° C. The vapor pressures of zinc at these temperatures are 10 mm., 100 mm., and 500 mm. The vapor pressure of copper at 850° C. is about $10^{-6}$ mm., thus is is always less than a millionth of that of zinc.

From the difference in vapor pressure between the two elements it is apparent that the zinc will be readily removed from the tungsten bar.

It is necessary to keep the evaporation temperature below the melting point of the intermetallic compound at all times. Otherwise if it melts there is a good chance that it will refill a portion of the open pores.

*Step VIII.*—The evaporated bars of Step VII are reweighed in air and from the original value determined in Step VI a porosity can be calculated. Values greater than 20% are desired.

*Step IX.*—The porous bars of Step VIII are placed in a small low temperature vacuum oven. The pressure is reduced to one micron and the bake-out temperature is set at 300° C. for a period of one hour. The bars are allowed to cool and while still under vacuum methylmethacrylate monomer is introduced to fully impregnate the porous bar. The bars are taken out of the low temperature oven after plastic impregnation, placed in close fitting glass test tubes, covered with excess liquid monomer, and allowed to polymerize. This takes approximately 24 hours to set up hard at 80° F.

*Step X.*—The polymerized bars of Step IX are machined to specifications. To remove the plastic the procedure in Step IX can be reversed, that is, the machined parts are heated to 300° C. for a period of 24 hours under one micron pressure. An alternate procedure is to heat the machined parts in air at 300° C. for 24 hours. This procedure leaves a slight carbon deposit which has not been found to be detrimental.

OTHER EXAMPLES

Basically the same technique is useable in making porous molybdenum EDM electrodes in which the pores are lined with an intermetallic alloy. But since molybdenum has a lower melting point than tungsten, the sintering temperature and time parameters must be reduced accordingly. Tantalum and columbium must be sintered and impregnated in vacuo or in an inert atmosphere, for these metals form hydrides in the presence of hydrogen, but in all other respects the process is the same. In no event does the sintering temperature go below 1400° C., which is well above the melting temperature of the intermetallic alloy.

For EDM electrodes the density of the porous refractory metal bars can be varied over rather wide limits by using either a lower or higher compacting pressure, a coarser or finer refractory powder, a lower or higher sintering temperature (provided it does not fall below 1400° C.), and either a shorter or longer sintering time. A practical density range for the porous refractory bar is between 50–88 percent of theoretical. Above 88% of theoretical density, the number of non-interconnecting pores increases very rapidly and impregnation with the intermetallic alloy is rendered difficult. Below 50% of theoretical density the mechanical strength of the porous refractory bars is poor.

Certain EDM operations require a highly porous electrode. The practical limit of the procedure described thus far limits the density to about 50% of theoretical for the porous refractory metal bar. Very low density refractory metal porous bars can be made by using a coarse particle size of the order of 10 microns. To this is added up to 2% by weight of either iron, cobalt, or nickel powder. The combination of the two powders is mixed thoroughly mechanically and then poured into a carbon mold, gently tapping the mold at the same time. The mold containing the powder is heated to a temperature greater than 1400° C. for a period of 10 to 20 minutes either in hydrogen or in vacuum as the case may be.

Densities as low as 30% of theoretical can be made by this procedure. Such a low density bar can then be processed as described previously. The addition of up to 2% of either iron, cobalt, or nickel lowers the melting point of the refractory metals appreciably. Consequently, the wear ratio cutting carbide drops to the order of one. However, for many applications such electrodes have a practical value. The function of iron, cobalt, or nickel is to increase the strength of the porous structure. These elements alloy with the refractory metals above 1400° C.

Molten copper and zinc mix in all proportions. The optimum concentration range is 70% zinc to 95% zinc balance copper by weight. The optimum zinc-silver concentration is about the same. Zinc can be distilled initially out of a 95% zinc-5% copper by weight rather rapidly, however the rate of removal becomes slower and slower as its concentration approaches that of copper. In practice the zinc concentration in any given bar is lowered by distillation until it is about the same as that of copper. Thus the remaining alloy within the porous refractory bar can be considered for practical purposes to be a brass with about a 50/50 concentration, which value gives about maximum EDM cutting action as illustrated in my copending patent application Serial No. 376,074.

In addition to zinc-copper alloys, twelve other intermetallics have been found to make porous tungsten, molybdenum, tantalum, and columbium EDM electrodes the pores of which are lined with the intermetallic alloy. The percentage ratios of the two metals in the following list of intermetallics are all by weight.

Cadmium-copper _____ (70–95% Cadmium)
Selenium-copper _____ (70–95% Selenium)
Tellurium-copper _____ (70–95% Tellurium)
Magnesium-copper _____ (70–95% Magnesium)
Lithium-copper _____ (75–20% Lithium)
Zinc-tin _____ (70–95% Zinc)
Cadmium-tin _____ (70–95% Cadmium)
Selenium-tin _____ (70–95% Selenium)
Tellurium-tin _____ (70–95% Tellurium)
Magnesium-tin _____ (70–95% Magnesium)
Lithium-tin _____ (75–20% Lithium)
Arsenic-tin _____ (70–95% Arsenic)

In the above intermetallic alloys copper may be replaced by silver without materially altering the results.

In Step IX styrene monomer can replace methylmethacrylate. Although it is more difficult to remove, and more carbon deposit will be found in the porous structure, no harmful effects have been found.

*Test results*

A comparative study of porous EDM electrodes made in accordance with the invention and several commercially available non-porous electrodes has yielded the following results when using the following EDM equipment and workpiece samples. All electrodes were machined to the same diameter.

Machine:
  Commercial Elox Machine
  Time of test—5 minutes
  Machine adjusted to give maximum cutting action
Sample:
  G.E. Tungsten Carbide Grade 883

| Electrode | Milligrams lost by Electrode Cutting Sample | Milligrams Cut from Sample | Wear Ratio |
| --- | --- | --- | --- |
| (1) Brass | No cutting action | | |
| (2) Mallory 10W3 | No cutting action | | |
| (3) Porous Tungsten | 640 | 735 | 1.15 |
| (4) R1000 | 416 | 1,710 | 4.1 |

The term "no cutting action" means that the Elox machine would start and stop. The servomechanism which controls the position of the electrode would be in continuous adjustment. Actually some cutting action did take place as in the case of the brass electrode, 100 milligrams was removed from the sample.

Notes of electrodes:

(1) *Brass electrode* used for these tests was ordinary yellow brass most commonly used by EDM operators.

(2) *Mallory 10W3* is a tungsten-copper composite commonly used by many EDM operators. It is non-porous.

(3) *Porous tungsten* was 50% of theoretical density made per Steps I, II, III, IV, and V, but not impregnated with the intermetallic alloy. The operation was erratic at low discharge currents.

(4) *R1000* was a porous tungsten electrode 50% of theoretical density. The pores of which were coated with approximately 50/50 weight ratio of zinc and copper. It was prepared according to the teachings of this invention. The electrode, 5/16″ O.D. by 1″ long, was sufficiently porous to allow four drops of dielectric fluid to pass through it per minute at 10 p.s.i. This was ample for flushing out the debris. The cutting action was smooth and steady even at low discharge currents.

*Alternate methods of fabricating porous EDM electrodes the pores of which are lined with an intermetallic alloy*

*Alternate Method A.*—In this example tungsten will be used as the refractory metal and an 80% zinc-20% copper intermetallic alloy will be used as an infiltrant. A porous tungsten bar is made per Steps I, II, and III. At this point the tungsten is weighed and from its known density a calculated amount of 80% zinc-20% copper by weight alloy is determined which will leave the pores of the tungsten bar 20% full after 75% of the zinc has been evaporated. This porous tungsten bar is then loaded into a high temperature impregnation furnace having a hydrogen atmosphere. The predetermined amount of 80% zinc-20% copper by weight alloy is placed in contact with the porous bar. The furnace temperature is then slowly elevated until the alloy becomes molten and begins to wet the porous tungsten. The temperature is increased 100° C. and left under these conditions for a half hour. The intermetallic alloy will in this length of time distribute itself throughout the pores of the entire bar. The temperature is rapidly increased to about 1000° C. and the excess zinc is distilled out in the hydrogen atmosphere. The rate of zinc removal rapidly decreases as its concentration approaches that of copper. Approximately 20 minutes for ¾″ O.D. by 4″ long bar is sufficient time to remove the excess zinc.

The exact composition, for example, equal weights of zinc and copper, could be used as a starting composition. Since the impregnation takes place at a much lower temperature one cannot be certain that the alloy is evenly distributed through the bar. Experimentally it has been found that former procedure gives much more uniform results. Test electrodes made as described have been found to yield the same wear ratios, etc. as test electrode, R1000.

*Alternate Method B.*—This is a mixed powder procedure whereby all the constituents are blended together first and the composite is sintered in one step. Although this method works well, the test results indicate a wear ratio of about one half of R1000. The reason is believed due to the fact that no sintering action takes place between the tungsten particles, and that the porous mass is held together by the intermetallic alloy. The essential steps are as follows:

(1) 60 grams of 10 micron powder, 32 grams of zinc powder, and 8 grams of copper powder are mixed thoroughly. The mixture is poured into a carbon mold tapping the mold gently at the same time.

(2) The mold and the powder mixture is placed in a hydrogen furnace and the temperature is increased slowly to the melting point of the 80% zinc-20% copper alloy (approximately 700° C.) at which temperature it is held for one half hour.

(3) The temperature is increased in 100° C. steps about every 10 minutes until a maximum of 1300° C. is reached at which time the furnace is turned off and the porous mass is allowed to cool. Such porous bars have been found to have a wear ratio about half that of R1000. The temperature of 1300° C. exceeds the boiling point of zinc, and although there is always some zinc left it is believed that the low concentration is also a contributing factor to the poor wear ratio.

Alternate Method A is a cheaper way of making a porous refractory metal electrode, the pores of which are lined with an intermetallic alloy. However, since several steps have been combined, far greater control must be exercised in order to produce a uniform product.

Alternate Method B is by far the cheapest method to make a porous EDM electrode. However, the quality of the material is poor by comparison. It is to be understood nevertheless that such an electrode is very useful since no other porous type is available.

While there have been shown preferred embodiments of my invention, it will be appreciated that many changes may be made therein without departing from the essential spirit of the invention as defined in the annexed claims.

What I claim is:

1. An electrical discharge machine electrode having a porous structure to permit the flow therethrough of a dielectric cleaning fluid, comprising a porous sintered body of refractory metal selected from the class consisting of tungsten, molybdenum, tantalum and columbium, the pores of said body being lined with an intermetallic alloy, one component of said alloy being partially removed to open said pores to permit flow therethrough of said fluid.

2. An electrical discharge machine electrode having a porous structure to permit the flow therethrough of a dielectric cleaning fluid, comprising a porous sintered body of refractory metal, the pores of said body being lined with an intermetallic alloy, one component of said alloy being partially removed to open said pores to permit the flow therethrough of said fluid, said intermetallic alloy being zinc-copper.

3. An electric discharge machine electrode having a porous structure to permit the flow therethrough of a dielectric cleaning fluid, comprising a porous sintered body of refractory metal, the pores of said body being lined with an intermetallic alloy, one component of said alloy being partially removed to open said pores to permit the flow therethrough of said fluid, said intermetallic alloy being cadmium-copper.

4. An electric discharge machine electrode having a porous structure to permit the flow therethrough of a dielectric cleaning fluid, comprising a porous sintered body of refractory metal, the pores of said body being lined with an intermetallic alloy, one component of said alloy being partially removed to open said pores to permit the flow therethrough of said fluid, said intermetallic alloy being magnesium-tin.

5. The method of fabricating an electrical discharge machine electrode, comprising the steps of compacting particles of a refractory metal to form a green compact, sintering said green compact to form a porous skeleton, impregnating said skeleton with a molten intermetallic alloy to fill all pores therein, and partially removing one component of said alloy to reopen said pores whereby said pores are lined with said intermetallic alloy.

6. The method of fabricating an electrical discharge machine electrode, comprising the steps of compacting particles of a refractory metal selected from the class of tungsten, molybdenum, tantalum and columbium to form a green compact, sintering said compact to form a porous skeleton, impregnating said skeleton with a molten intermetallic alloy to fill the pores thereof, partially removing one component of said intermetallic to reopen said pores, impregnating said reopened pores with a plastic filler facilitating machining, machining said filled skeleton to the desired electrode dimensions, and removing said filler.

7. The method as set forth in claim 6, wherein said intermetallic alloy zinc-copper.

8. The method as set forth in claim 6, wherein said one component is removed by vacuum distillation.

9. The method as set forth in claim 6, wherein said plastic is removed by heating the skeleton in air.

10. The method as set forth in claim 6, wherein said plastic is methyl methacrylate.

References Cited by the Examiner

UNITED STATES PATENTS

| | | | |
|---|---|---|---|
| 2,160,659 | 5/1939 | Hensel | 29—182.1 |
| 2,646,456 | 7/1953 | Jacquier | 75—222 X |
| 3,069,757 | 12/1962 | Beggs et al. | 29—182.1 |

FOREIGN PATENTS 836,749    6/1960    Great Britain.

BENJAMIN R. PADGETT, *Primary Examiner.*

M. J. SCOLNICK, *Assistant Examiner.*